Jan. 15, 1929.  1,699,177
F. BERGIUS
PROCESS FOR OBTAINING HYDROGENATION GAS FOR HYDROGENATING CARBON
AND HYDROCARBONS FROM GASES CONTAINING METHANE AND HYDROGEN
Filed Nov. 30, 1925
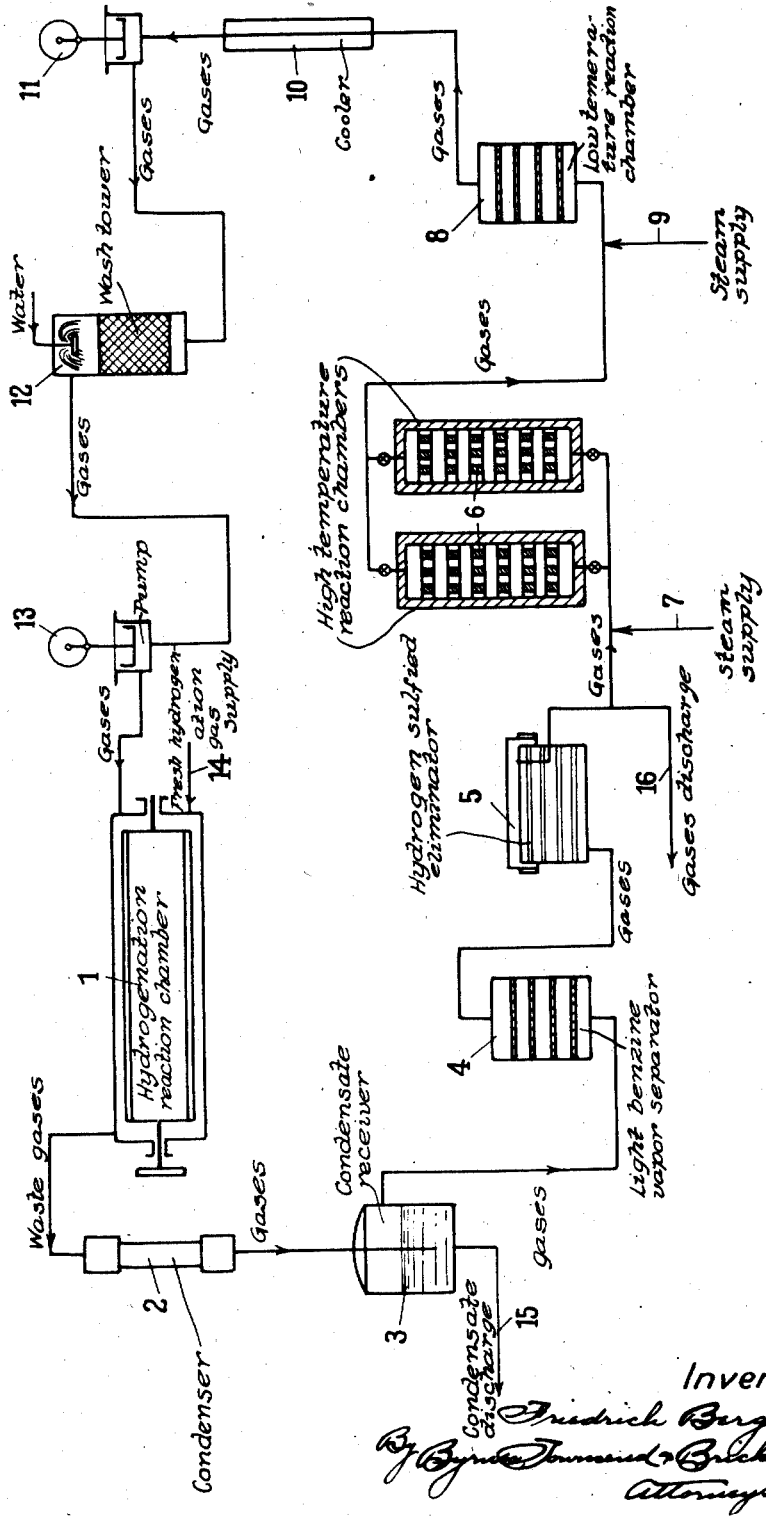
Inventor:
Friedrich Bergius,
By Byrne Townsend & Breckenstein,
Attorneys.

Patented Jan. 15, 1929.

1,699,177

UNITED STATES PATENT OFFICE.

FRIEDRICH BERGIUS, OF HEIDELBERG, GERMANY.

PROCESS FOR OBTAINING HYDROGENATION GAS FOR HYDROGENATING CARBON AND HYDROCARBONS FROM GASES CONTAINING METHANE AND HYDROGEN.

Application filed November 30, 1925, Serial No. 72,414, and in Germany December 18, 1924.

In the hydrogenation of carbon and hydrocarbons under high pressure, waste gases are formed which consist chiefly of methane ($CH_4$) and its homologues with hydrogen and small quantities of alien gases, chief among which are nitrogen, carbon monoxide (CO) and carbonic acid ($CO_2$). The relatively considerable quantity of hydrogen contained in these waste gases can only be used for heating purposes, unless one succeeds in transforming the waste gases into a hydrogenation gas sufficiently rich in hydrogen by economically sound means.

It is indeed well known that the uncondensable hydrocarbons which the waste gases contain in considerable quantity, can be converted into hydrogen, either by breaking them up merely by the application of temperatures of 1000° and above or by converting them in the presence of steam of water. Both processes are however practically inadequate in themselves for the purpose of regenerating the waste gases, because with the mere analytic reaction, the hydrogen gained is not sufficient for the purpose of using the gas once more as hydrogenation gas and also because, at the same time as hydrogen, carbon monoxide is produced in such quantities that the hydrogenating process and the circulation of the gas cannot be successfully kept up.

The present invention overcomes this difficulty by subjecting the waste gases, which consist principally of methane and hydrogen, to treatment with steam at various temperatures namely, to a first treatment at a high temperature and then to another treatment at a lower temperature, the first treatment leading to the conversion, referred to above, of the methane into hydrogen and carbon monoxide, while the last treatment converts the carbon monoxide, in a manner likewise well known in itself, into hydrogen and carbonic acid, this last body, in contrast to carbon monoxide, being easily removable by well known processes. The removal of the carbonic acid is effected for the purpose in view before the gas is utilized as hydrogenation gas but it can also take place at any time in the course of the process, which is a continuous cyclic one, after every new utilization of the gas for hydrogenating purposes.

The accumulation of alien gases, and especially nitrogen, in the gas mixture in the case of the continuous cyclic process can be avoided by removing from the circulation a sufficiently large portion of the gas. The possibility of doing this without jeopardizing the continuous use of the regenerated gas in a recurrent circle, depends on the extraordinary increase of hydrogen, through the treatment of the gases with steam, this leading to the formation of hydrogen at each of the two stages of the operation.

In given circumstances a plant for the hydrogenation of carbon and hydrocarbons may work in close connection with a coke making plant, for instance, the latter supplying for its part gases containing methane and hydrogen. In this case, the process described here for obtaining hydrogenation gas from gases containing methane and hydrogen can also be applied to the gases of the coke works and these gases could be used instead of the converted gases of the hydrogenation plant, for the work of that plant. A plant for carrying out the process described above is diagrammatically shown in its chief features in the drawing appended hereto.

1 shows the reaction chamber of a hydrogenation plant. 2 is the condenser for the condensible bodies, 3 is the trap or receiver in which the liquid condensed products are separated from the waste gases. 4 is a device for extracting the light benzine vapours still contained in the gases, 5 is a device for eliminating the sulphuretted hydrogen contained in the gases. 6 shows the superheating apparatus, working on the regenerating system, into which the gases, after being mixed with steam, which is admitted through the lead 7, are conducted for the purpose of the reaction at the high temperature. 8 shows the catalyzing apparatus, into which the gases are brought for the purpose of the reaction with steam at the lower temperature stage, for the purpose of converting the carbon monoxide, formed during the reaction at the high temperature, into carbonic acid.

As the carrying out of the hydrogenation process does not demand a gas free from carbon monoxide, the presence of carbon monoxide in the hydrogenating gas being rather a disadvantage only in so far as it reduces the pressure which the active hydrogen would exert if it were alone present, it is therefore not necessary to carry out to the full the process of converting the carbon monoxide into carbonic acid which can be easily removed by washing or similar means, but one can leave a certain percentage of carbon monoxide in the gas. The process thereby gains considerably from the economic point of view. 9 shows a steam admission pipe for the catalyzing apparatus. The reaction in the catalyzing apparatus takes place in the well known manner with the employment of a suitable catalytic agent, iron oxide, for instance. Instead of steam, water can also be introduced into the hot gases, the evaporation then taking place through the heat contained in these gases subject to the conditions that one should be careful not to allow the temperature to fall below the temperature which must exist in the catalyzing apparatus in order to permit the reaction to take place.

The working temperature at the high temperature stage is approximately 1100° and at the low temperature it is from 300 to 500° approximately. 10 shows a cooling apparatus for the regenerated gas, 11 shows a preliminary compression pump and 12 a wash tower for the removal of the carbonic acid. By means of compressor 13, the ready hydrogenation gas is brought to the working pressure, in order to introduce it once more into the reaction tank 1. 14 shows the pipe lead for the hydrogenation gas. 15 a pipe for taking away the hydrogenation products which are not in gaseous form; 16 is a lead intended for the removal of the excess of gas given out.

What I claim is:

1. Process which comprises subjecting waste hydrogenation gas such as that obtained in the hydrogenation of coal to steam treatment in two successive stages at different temperatures, the treating temperature in the first stage being the higher one and being chosen sufficiently high to decompose methane in the absence of a catalyzer and to give rise to the formation of carbon monoxide and hydrogen and the lower temperature steam treatment being carried through in the presence of a catalyzer adapted to enhance the reaction between carbon monoxide and steam.

2. In processes of hydrogenating carbon containing material by treating it with hydrogen-containing gas under pressure, subjecting the resulting gases to a condensing treatment, and separating the condensate from the uncondensed waste gases, treating the uncondensed waste gases with added steam at a temperature sufficient to bring about a reaction with formation of hydrogen and carbon monoxide, bringing the carbon monoxide constituent of the resulting gases into reaction with steam at a lower temperature and in the presence of a catalyzer adapted to enhance this reaction, removing carbon dioxide from the gases after the last named treatment and using the so modified gas in the hydrogenation reaction.

3. In processes for the hydrogenation of carbon-containing material involving treating the material under pressure with a gas consisting essentially of hydrogen, subjecting the resulting waste gases to a condensing operation and separating condensate from the uncondensed waste gases consisting for the most part of hydrogen and methane-type hydrocarbons with carbon monoxide, carbon dioxide, and nitrogen, the steps which consist in reacting the uncondensed waste gases with steam in the absence of a promoter of reaction and at a temperature of about 1100° C. to the decomposition of the methane-type hydrocarbons and steam to hydrogen and carbon monoxide, adding steam to the resulting gas mixture, reacting the steam with the carbon monoxide content of the said resulting gas mixture in the presence of a suitable catalyst and at a temperature of from about 300° to about 500° C. to the production of hydrogen and the conversion of carbon monoxide to carbon dioxide, thereafter removing the carbon dioxide content of the gas mixture and returning the residual gas to the hydrogenation operation.

4. In processes for the hydrogenation of carbon-containing material involving treating the material under pressure with a gas consisting essentially of hydrogen, subjecting the resulting waste gases to a condensing operation and separating condensate from the uncondensed waste gases consisting for the most part of hydrogen and methane-type hydrocarbons with carbon monoxide, carbon dioxide, and nitrogen, the steps which consist in reacting the uncondensed waste gases with steam in the absence of a promoter of reaction and at a temperature of about 1100° C. to the decomposition of the methane-type hydrocarbons and steam to hydrogen and carbon monoxide, contacting the resulting gas mixture with water to the simultaneous addition of water vapor and reduction in the temperature of the gas mixture, passing the gas mixture containing water vapor at from about 300° to about 500° C. over a suitable catalyst, to the conversion of its carbon monoxide and water vapor contents to hydrogen and carbon dioxide, removing the carbon dioxide content of the gas mixture, and returning the residual gas to the hydrogenation operation.

In testimony whereof, I affix my signature.

Dr. FRIEDRICH BERGIUS.